Patented Dec. 31, 1929

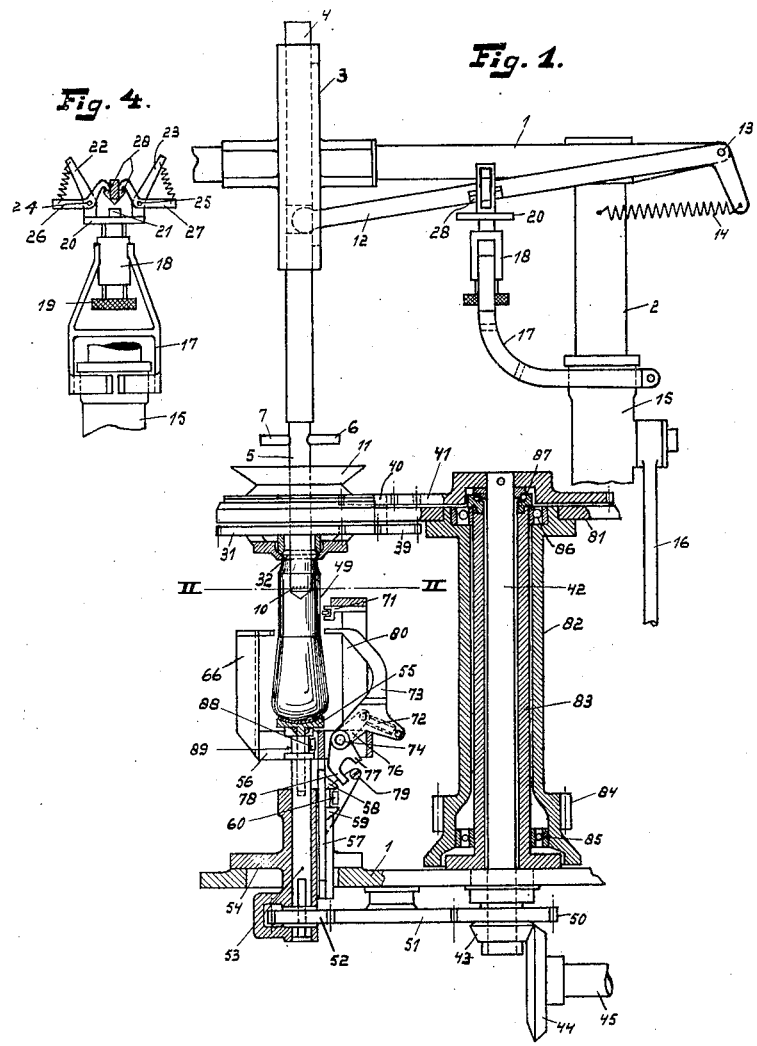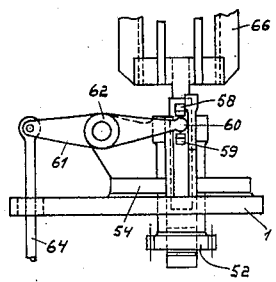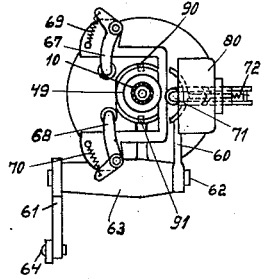

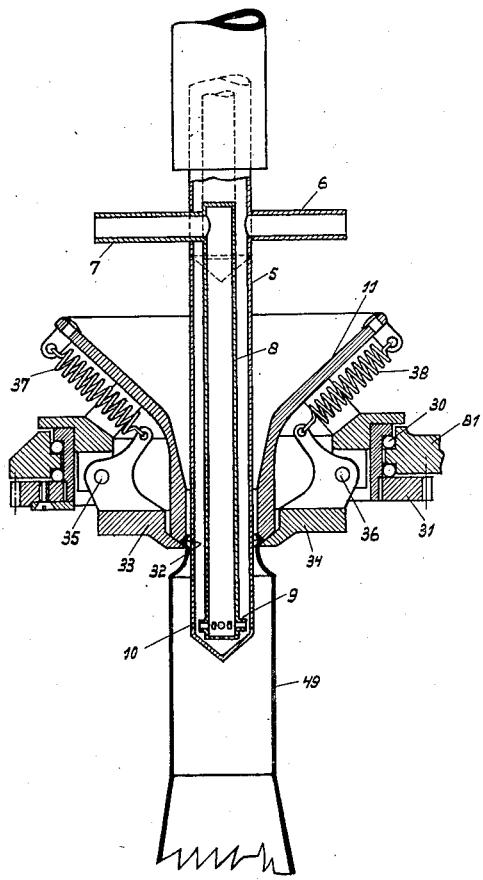

1,741,662

UNITED STATES PATENT OFFICE

PANCRAS SCHOONENBERG, OF EINDHOVEN, NETHERLANDS, ASSIGNOR TO NAAMLOOZE VENNOOTSCHAP INTERNATIONAAL OCTROOIBUREAU, OF EINDHOVEN, NETHERLANDS

PROCESS AND APPARATUS FOR SEALING OFF A HOLLOW GLASS BODY FROM AN ANNULAR GLASS BODY

Application filed August 20, 1925, Serial No. 51,337, and in the Netherlands October 10, 1924.

This invention relates to a process of and apparatus for fusing off a hollow glass body from an annular glass body and is more particularly concerned with the fusing off of hollow glass bodies placed with the bottom undermost, such for example as bulbs for electric lamps.

When hollow glass bodies are blown, either by hand with the aid of a glass-maker's pipe or in an automatic glass-blowing machine, an annular portion is formed on the neck side of the blown body, which portion is referred to as "the navel" or "lost head" and by which the blown body was attached to the glass-maker's pipe or to the so-called parison mould. As a rule this portion requires to be removed before further manipulation can be entered upon.

It is known to remove the lost head or navel by so-called "wetting off" and to trim the sharp edge thus produced of the glass body by heating with a gas burner, owing to which heating the strains produced adjacent the glass-edge are suppressed at the same time.

It has also been proposed to melt off the lost head or navel from the hollow body by directing from the outside a flame against the place of severance until the glass melts at this place, whereupon the two bodies are removed from each other, for example by reason of the lost head or navel falling down under the influence of gravity.

This process yields good results when fusing off hollow glass bodies placed with the bottom uppermost. However, in practice (for example in automatic glass-blowing machines) it may be necessary to fuse off hollow glass bodies placed with the bottom undermost and in this case there is the disadvantage that the brim of the glass body under the influence of the pressure of the gas-flame falls over towards the inside so that frequently the body becomes unserviceable.

In the process according to the invention a flame is directed from the interior in the desired plane of severance against the wall of the hollow glass body until the glass melts, whereupon the two glass bodies are separated. Preferably the glass body and the flame are rotated relatively to each other during the fusing off operation. The annular glass body may be held in a vertical direction, whilst the hollow glass body is being lowered at a mechanically controlled speed.

The apparatus for fusing off a hollow glass body placed with the bottom undermost is characterized by a device for holding the annular glass body, a burner for heating the glass wall from the inside in the desired plane of severance and a device for bringing the glass body and the burner into and out operative relation to each other.

In the process and apparatus according to the invention the outwardly directed pressure of the gas-flames tends to prevent the brim of the fused-off glass body flanging towards the inside.

When the glass weakens by the action of heat of the gas burners the annular portion (for example the lost head) and the hollow glass body may be separated by dropping the latter under the influence of gravity. Preferably however, there is provided a device for supporting the hollow glass body, means being also provided in order to move the supporting device and the holder of the glass body vertically in relation to each other so that the hollow glass body after it is fused off is removed from the annular portion.

Furthermore a device may be provided in order to remove the fused off body laterally from the supporting device.

In order that the glass body and the flame be rotated relatively to each other the former may be so mounted as to be stationary and the burner to be rotatable. Preferably, however, means may be provided to rotate the holder of the glass body and the supporting device during the fusing off operation at an equal speed of revolution whilst the burner stands idle. The supporting device may be provided with a member that is adapted to rotate, which member is turned when the supporting device descends and which during such movement removes the glass body laterally from the supporting device whereas when the supporting device rises it automatically returns to the off-position.

Other features of the apparatus according to the invention will be clearly understood by reference to the following description of the invention.

The accompanying drawing illustrates a construction of apparatus according to the invention. The apparatus shewn may form part of an automatic bulb-blowing machine. Those members of the machine that are not important in connection with the invention are omitted in the drawing, in which Figure 1 shows the apparatus as a whole.

Figure 2 is a section on the line II—II in Figure 1 and also a plan of the more downwardly located members.

Figure 3 is a side elevation of the lowermost part of the apparatus shewn in Figure 1.

Figure 4 is a detail view of the device adapted to vertically move a lever which brings the burner into and out of operative relation to the bulb.

Figure 5 is a detail view on an enlarged scale of the neck ring for the parison mould in which the bulb is suspended and also of the burner.

The different component members of the apparatus according to the invention are secured to fixed parts 1 which are united to the frame (not shewn) of the bulb-blowing machine. The uppermost part 1 has connected to it a vertical column 2 and a guide box 3 for a rod 4 which has secured to it a burner 5 (Figure 1). The burner 5 comprises a hollow tube (Figure 5) having arranged inside a second tube 8. The flues 6 and 7 which connect to the hollow tubes 5 and 8 serve to admit gas and air or oxygen under pressure respectively. The compressed air passes through the small tubes 9 which open opposite to apertures 10 uniformly distributed about the circumference of the lower end of the tube 5. In Figure 5 the burner is shewn in operative relation to the bulb 49, whilst the uppermost position of the burner is indicated by a few dotted lines.

The vertical rod 4 on which the burner 5 is suspended, is vertically moved by a lever 12 which is pivoted on a pin 13 and which under the influence of a spring 14 holds the rod 4 normally in its uppermost position. The lever 12 is lowered against the action of the said spring by means of a sleeve 15 which is adapted to slide on the column 2 and has secured to it a rod 16. The said rod may be vertically moved in any suitable manner, for example by means of a cam not shewn. A strap 17 is clamped on the sleeve 15 and carries at its bifurcated end a small bush 18 (Figures 1 and 4) which is internally threaded and in which a set screw 19 with a head 20 is adapted to move vertically.

The said head 20 has fitted on it arms 22 and 23. Bell-cranks 26 and 27 which are pivoted on fixed points 24 and 25 are provided with hook-shaped ends adapted to engage projections 28 of the lever 12.

When the rod 16 rises and the sleeve 15, the bush 18 and the head 20 consequently rise likewise, the spring 14 pulls the lever 12 upwards so that also the burner 5 rises. When, however, the sleeve 15 descends, the hook-shaped ends of the bell-cranks 26 and 27 pull the lever 12 downwards by means of projections 28 so that the burner 5 is likewise lowered. If, however, for some reason, for example on account of glass having accumulated in the funnel-shaped portion of a parison mould in which the glass body is suspended, the burner 5 on being lowered encounters a considerable resistance, the springs of the bell-cranks 26 and 27 are extended, so that the hook-shaped ends of the said bell-cranks snap off the projections 28 and the lever is not pulled down.

Owing to this arrangement rupture of or damage to memebrs is avoided.

The neck ring 11 of the parison mould (Figures 1 and 5) in which the hollow glass body is suspended, is rotatably mounted in a part 81 on ball-bearings 30. During the fusing off operation the neck ring of the parison mould is rotated by means of a toothed wheel 31 driven from a vertical shaft 42, which is rotatable in the stationary part 1 and in a bush 83, by gear wheels 39, 40 and a gear wheel 41 which is rotatable on a ball bearing 87. The vertical shaft 42 is provided with a bevel gear 43 which is engaged by a bevel gear 44 on a shaft 45, which last is operated in any suitable manner, for example, by an electromotor not shewn.

It is well to note that the column 42 and the column 2 with accessory members, which are shewn in Figure 1 in the plane of the drawing, are in reality displaced relatively to each other through an angle, for example 90°.

The bulb 49 is suspended by the upper end of the lost head in a circular interstice 32 (Figure 5) which is constituted by the lower end of the funnel-shaped portion of the parison mould and by the edges of two parts 33 and 34 which are pivoted on 35 and 36 and which are pulled by springs 37 and 38 against the lower end of the funnel-shaped portion.

In order that the bulb 49 may be brought into and out of the operative position, the neck ring 11 of the parison mould can be horizontally displaced as a whole.

For this purpose the bush 83 has arranged on it a hollow column 82 rotatably mounted on ball bearings 85 and 86. At the upper end of the said column is secured the part 81 in which the neck ring 11 is rotatably fitted so that when the column 82 is rotated, whether by hand or mechanically by a gearing 84, the neck ring of the parison mould is swung horizontally.

The devices for supporting, centering and ejecting the bulb are shewn in Figures 1, 2 and 3. The vertical shaft 42 is provided with a gear wheel 50 which through a gear wheel 51 actuates a pinion 52. The said pinion imparts a rotary motion to a shaft 53 which is vertically movable in a pedestal 54. A seat 55 on which the bottom of the bulb is caused to bear is provided with a stud which is loosely inserted in the shaft 53. When the shaft 53 rotates, the seat 55 is carried along with it by friction. The transmission between the shaft 42 and the neck ring 11 and between the shaft 42 and the shaft 53 with the seat 55 are such that the neck ring of the parison mould and the seat rotate at a substantially equal speed of revolution. A head 56 is adapted to rotate on the upper end of the shaft 53. The said head has secured to it a downwardly moving rod 57 guided vertically in the pedestal 54. The rod 57 is provided with projections 58 and 59 between which enters the end of a lever 60 which is secured on a shaft 62 rotatably mounted in a pedestal 63 (Figure 3). A lever 61 the end of which is vertically moved by a rod 64 is attached to the other end of the shaft 62 so that when the rod 64 is moved vertically, the rod 57 with the members connected to it is likewise moved vertically. The vertical movement of the rod 57 is transmitted by a roller 88 of the head 56, (which roller engages an annular groove 89,) to the shaft 53 and the seat 55. The arrangement is such that the rod 57 descends when the glass is sufficiently fused at the desired place of severance. Owing to the seat 55 descending it is possible for the bulb 49 which is constantly rotated to fall downwards which ensures the severance of the lost head. A little before the ejection of the bulb the seat 55 is caused to bear on studs 90 and 91 secured to the pedestal 54, so that the rotary motion of the seat ceases and consequently the bulb when ejected no longer rotates.

The bulb which stands free after the fusing off operation is held by three rollers which are rotatably secured to the ends of bell-cranks 67 and 68 and of a rod 71. The bell-cranks 67 and 68 are rotatably fitted at the end of two supports 66 which are mounted on the head 56, springs 69 and 70 keeping the rollers pressed against the wall of the bulb. The rod 71 is secured to a support 80 which is likewise mounted on the head 56.

An ejector 73 bifurcated at the end is rotatably fitted on a stud 74 secured in the head. The ejector 73 connects by a spring 72 to a bell-crank 76 which is likewise pivoted on the stud 74 and is provided at one end with two projections 77 and 78.

When the head 56 continues descending the projection 77 engages a roller 79 which is rigidly connected to the pedestal 54. On this account the bell-crank 76 is turned and, after the spring 72 is stretched, the ejector 73 is similarly turned, the bulb being thus removed laterally from the supporting device against the action of the springs 69 and 70. When the table 56 rises again the projection 78 engages the roller 79 and the ejector 73 is brought back again to the off-position.

For the sake of clearness the operation of the apparatus shewn in the drawing will be briefly described.

When the burner is in the uppermost position shewn in Figure 5, the neck ring 11 of the parison mould with a glass body that is suspended in the mould in some way can be passed under the burner until the burner and the neck ring are arranged coaxially to each other. Then the burner 5 is lowered into the operative position shewn in Figures 1 and 5 and the glass body is rotated in the manner hereinbefore described. Meanwhile the seat 55 is moved upwards to such an extent that it is positioned close under the bottom of the glass body.

The gas flames heat the wall of the glass body from the inside and when the glass has become sufficiently heated at the place of severance the seat 55 descends with its accessory members with the result that the bulb is severed from the lost head and is then removed laterally from the supporting device.

The lost head which is still suspended in the neck ring of the parison mould must be removed. When the burner 5 has risen again, the neck ring 11 can be slid away under the burner 5 and the lost head can now be removed by hand or mechanically by exerting a pressure on the upper end of the glass so that the rotary halves 33 and 34 are pushed away against the action of the springs 37 and 38 to such an extent that it is possible for the lost head to fall down.

What I claim is:

1. A process for fusing-off a part from an open hollow glass body, consisting in directing a flame in the desired plane of severance against the inner surface of the hollow body until the glass melts after which the glass body and the part are separated, while during the fusing-off operation the glass body and the flame are rotated relatively to each other.

2. A process for fusing-off a hollow glass body placed with the bottom undermost from an annular glass body, consisting in directing a flame from the interior in the desired plane of severance against the wall of the hollow glass body until the glass melts, after which the two glass bodies are separated.

3. A process for fusing-off an annular glass body from a vertically placed hollow glass body consisting in directing a flame against the inner surface of the hollow body until the glass melts, after which the annular glass body and the hollow glass body are separated.

4. A process for fusing-off a portion from a hollow glass body, consisting in directing a flame against the inner surface of the glass body until the glass melts, after which the hollow glass body falls off by gravity.

5. Apparatus for severing an annular glass body from a hollow glass body by fusion comprising a tubular shaped burner provided with radial openings lying substantially in a plane and means for moving this burner relatively to the holder of the hollow glass body, a fuel supply connected to the said burner, the latter being adapted to be moved inside the glass body and to direct a flame to the inner surface of said glass body.

In testimony whereof I affix my signature, at the city of Eindhoven, this 30th day of March, A. D. 1925.

PANCRAS SCHOONENBERG.